(12) United States Patent
Rossini et al.

(10) Patent No.: US 10,912,366 B2
(45) Date of Patent: Feb. 9, 2021

(54) COSMETIC REPURPOSING SYSTEM

(71) Applicant: MRK Cosmetics, Inc., Denver, CO (US)

(72) Inventors: Jill Rossini, Denver, CO (US); Bradford Rossini, Denver, CO (US)

(73) Assignee: MRK Cosmetics, Inc., Denver, CO (US)

( * ) Notice: Subject to any disclaimer, the term of this patent is extended or adjusted under 35 U.S.C. 154(b) by 0 days.

(21) Appl. No.: 16/541,786

(22) Filed: Aug. 15, 2019

(65) Prior Publication Data

US 2020/0000200 A1   Jan. 2, 2020

Related U.S. Application Data

(63) Continuation-in-part of application No. 15/291,995, filed on Oct. 12, 2016, now Pat. No. 10,405,633.

(60) Provisional application No. 62/240,606, filed on Oct. 13, 2015.

(51) Int. Cl.
| | | |
|---|---|---|
| *A45D 33/00* | (2006.01) | |
| *B29C 43/36* | (2006.01) | |
| *B29L 31/00* | (2006.01) | |
| *B29K 105/26* | (2006.01) | |
| *B29K 105/00* | (2006.01) | |

(52) U.S. Cl.
CPC .......... *A45D 33/003* (2013.01); *B29C 43/36* (2013.01); *A45D 2033/001* (2013.01); *B29K 2105/251* (2013.01); *B29K 2105/26* (2013.01); *B29L 2031/718* (2013.01)

(58) Field of Classification Search
CPC ............ A45D 33/003; A45D 2033/001; A45D 33/00; B29C 43/36; B29C 43/02; B29L 2031/718; B29K 2105/26; B29K 2105/251
See application file for complete search history.

(56) References Cited

U.S. PATENT DOCUMENTS

| | | | |
|---|---|---|---|
| 2,209,781 A | 7/1940 | Lewis | |
| 3,300,387 A | 1/1967 | Kole | |
| 4,337,859 A | 7/1982 | Murphy | |
| 5,180,240 A | 1/1993 | Gueret | |
| 5,520,202 A * | 5/1996 | Arbree | A45C 11/008 132/148 |
| 5,845,658 A | 12/1998 | Sussman | |
| 6,358,448 B1 * | 3/2002 | Green | A45D 33/006 264/109 |
| 8,235,059 B2 | 8/2012 | Pires et al. | |
| 2004/0129599 A1 * | 7/2004 | Yi-Hung | A45D 33/008 206/581 |

(Continued)

FOREIGN PATENT DOCUMENTS

| | | |
|---|---|---|
| GB | 1001690 A | 8/1965 |
| JP | 07-10721 A | 1/1995 |

(Continued)

*Primary Examiner* — Michael M. Robinson
(74) *Attorney, Agent, or Firm* — Hall Estill Attorneys at Law; Tyler Mantooth

(57) ABSTRACT

Cosmetic materials can be blended and otherwise repurposed with a cosmetic repurposing system that positions a screen above a void of a base before inserting a cosmetic material atop the screen and forcing the cosmetic material through the screen into the void to fill a container positioned in the void with cosmetic material powderized by the screen.

19 Claims, 13 Drawing Sheets

(56) References Cited

U.S. PATENT DOCUMENTS

2012/0144590 A1  6/2012  Yamaguchi et al.
2013/0234351 A1  9/2013  Johnson

FOREIGN PATENT DOCUMENTS

JP       25-399043    B2   1/2014
WO    2014/069879  A1   5/2014

* cited by examiner

COSMETIC REPURPOSING SYSTEM

RELATED APPLICATIONS

The present application is a continuation-in-part of copending U.S. patent application Ser. No. 15/291,995 filed Oct. 12, 2016, which claims domestic priority to U.S. Provisional Patent Application No. 62/240,606 filed Oct. 13, 2015, the contents of which are hereby incorporated by reference.

SUMMARY

In some embodiments, a cosmetic repurposing system positions a screen above a void of a base before inserting a cosmetic material atop the screen and forcing the cosmetic material through the screen into the void to fill a container positioned in the void with cosmetic material powderized by the screen.

Other embodiments of a cosmetic repurposing system position a screen above a void of a base before inserting a cosmetic material atop the screen and forcing the cosmetic material through the screen into the void to fill a container positioned in the void with cosmetic material powderized by the screen. The powderized cosmetic material is then pressed into a form within the container with a tool.

DETAILED DESCRIPTION

Figure 1:
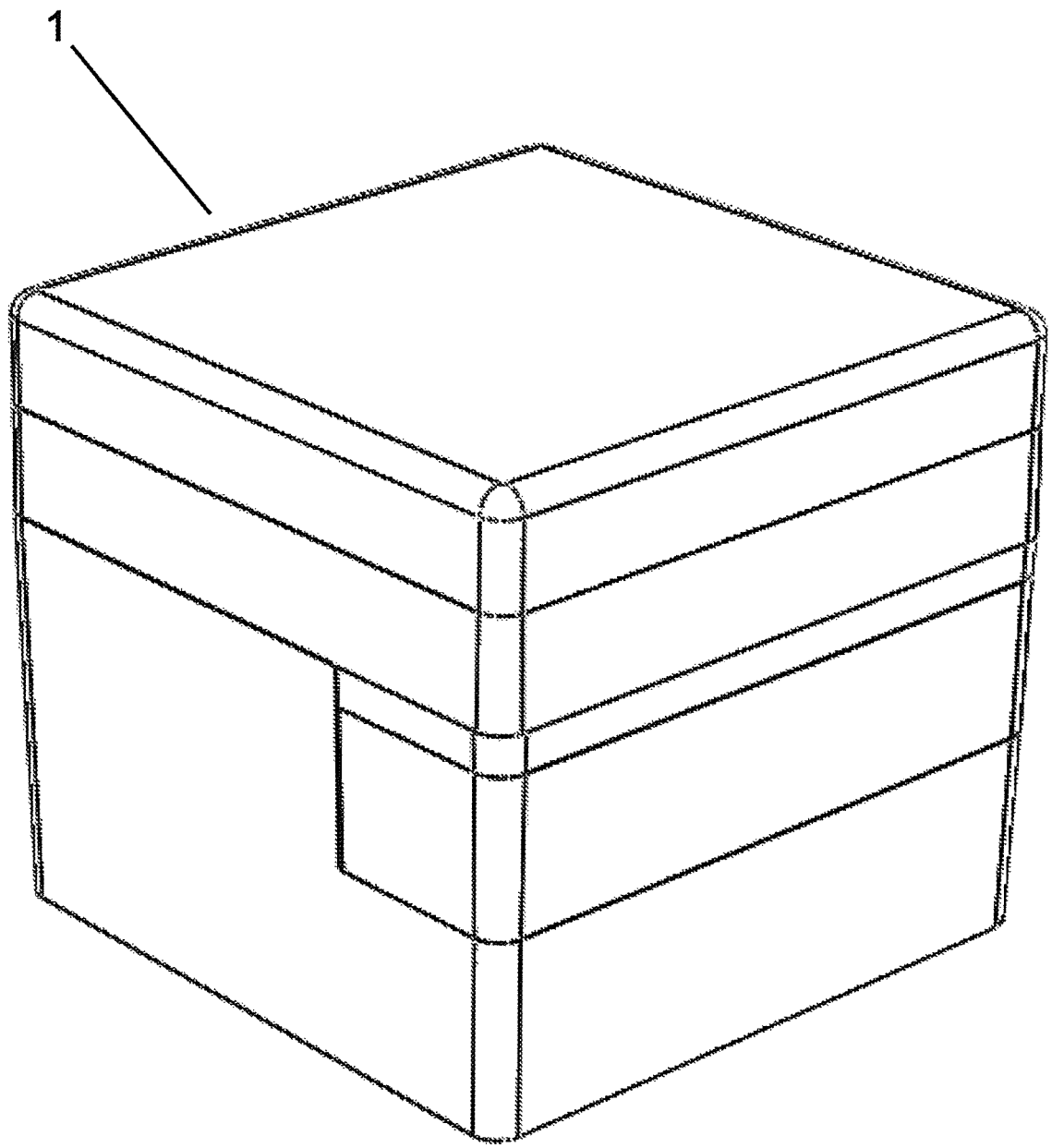
FIG. 1 depicts portions of an example self-enclosed cosmetic repurposing system arranged in accordance with some embodiments.
Figure 2:
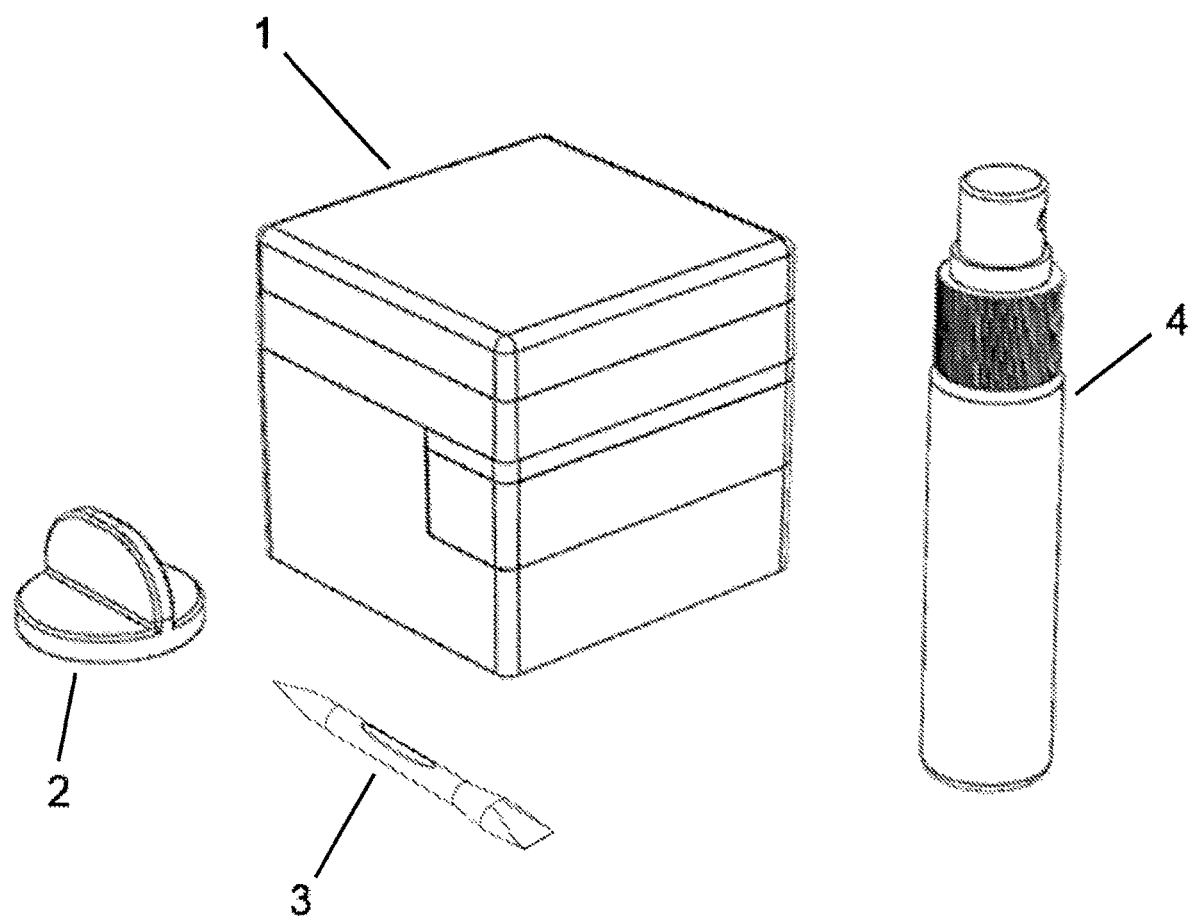
FIG. 2 depicts portions of an example self-enclosed cosmetic repurposing system in which assorted embodiments can be practiced.
Figure 3:
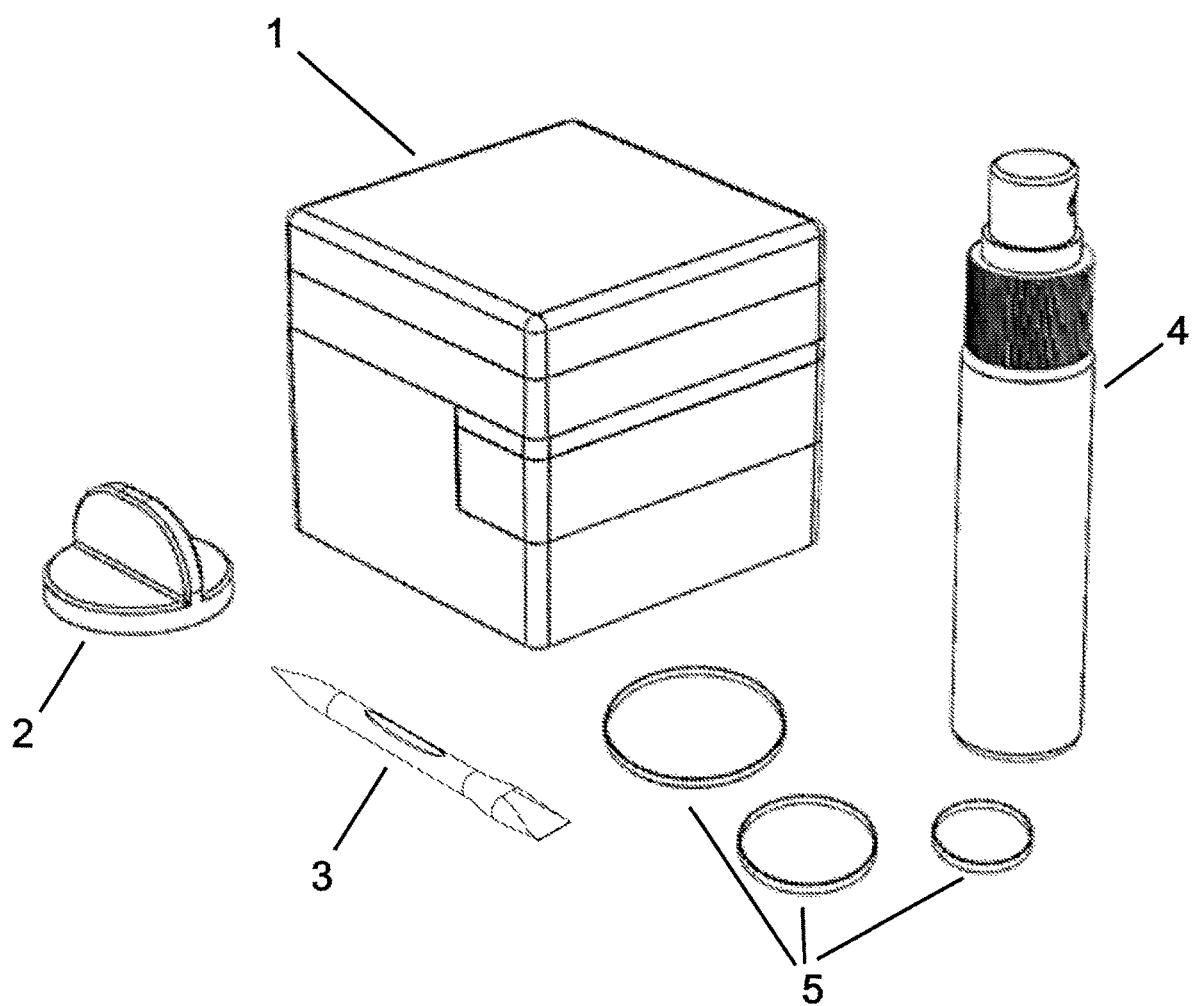
FIG. 3 depicts portions of an example self-enclosed cosmetic repurposing system in which some embodiments may be practiced.
Figure 4:
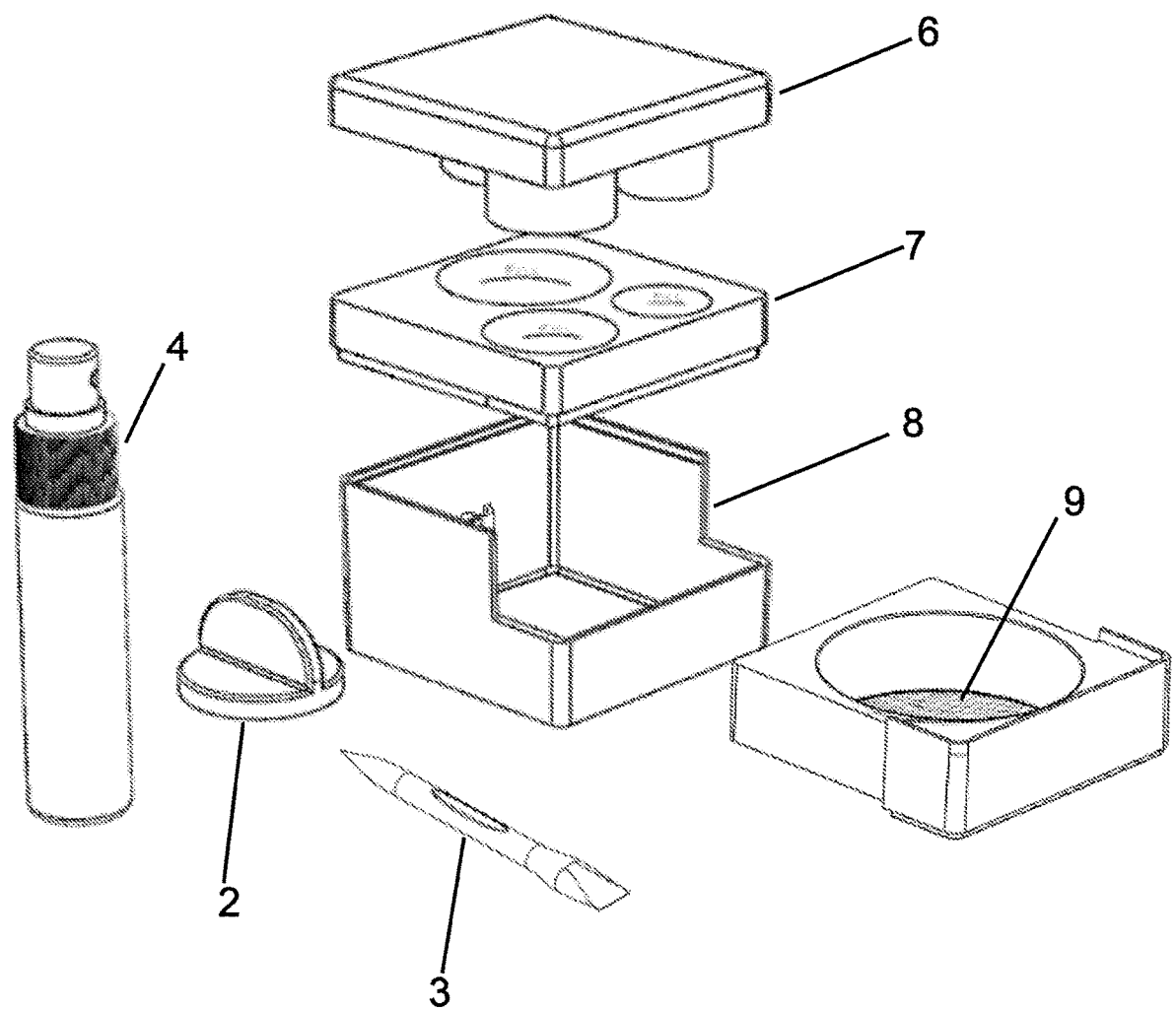
FIG. 4 depicts an exploded view of portions of an example self-enclosed cosmetic repurposing system.
Figure 5:
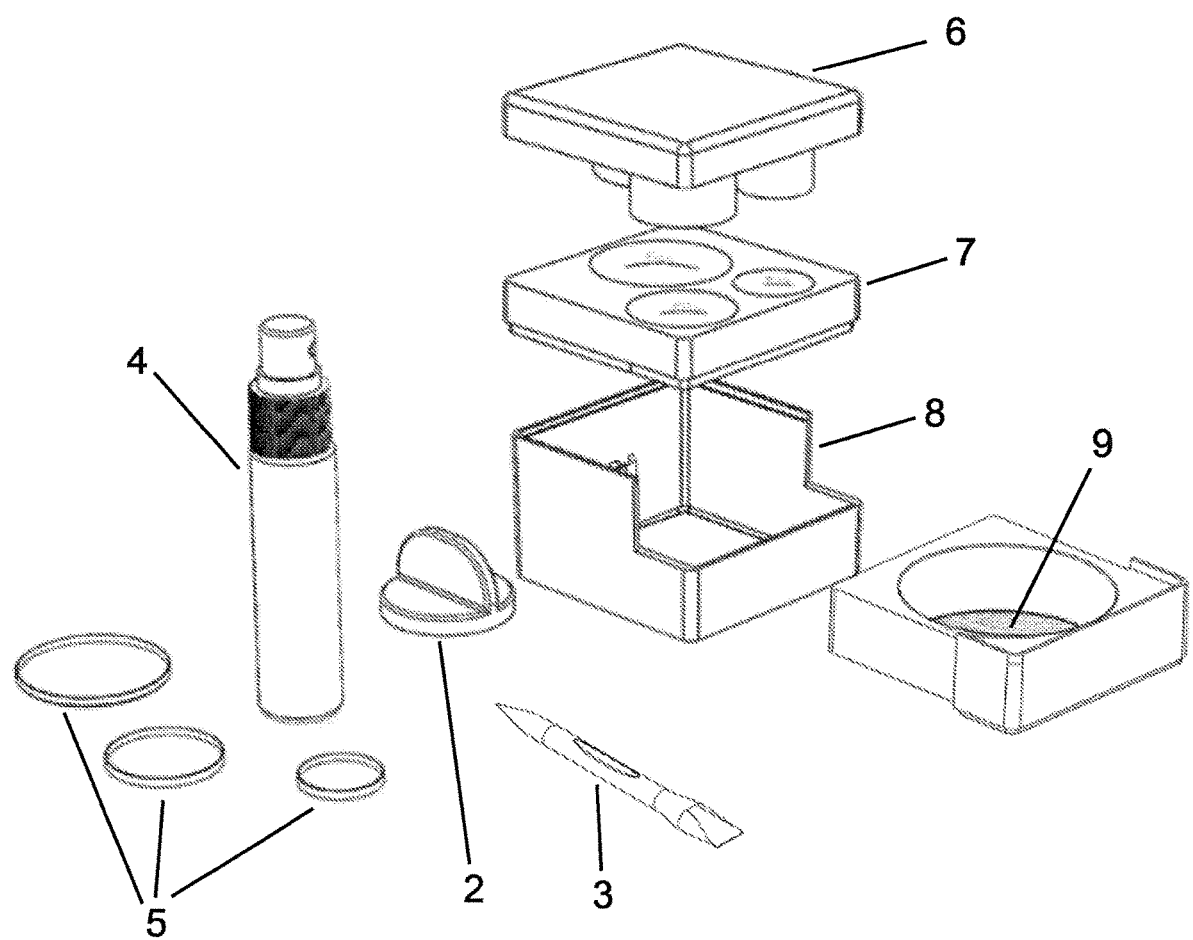
FIG. 5 depicts an exploded view of portions of an example self-enclosed cosmetic repurposing system arranged in accordance with various embodiments.

Various embodiments of the present disclosure are generally directed to a cosmetic repurposing system that allows makeup material to be accurately and efficiently positioned within a container.

Makeup materials have traditionally been packaged in containers that are prone material waste and/or spoilage due to environmental and/or manual abuse. For instance, when dropped, a makeup container may not adequately protect cosmetic makeup materials. The shock of impact associated with a drop may dislodge or cause the disintegration of the contents of cosmetic makeup materials.

Another example of cosmetic material waste derives from the design of cosmetic materials containers. For instance, many compacts utilize a circular dish to contain makeup, which interacts with an application pad that extracts makeup from the center of the dish first and results in ridges of makeup material on the sides of the compact dish, over time. In association with known cosmetic applicators, the shape of the specific cosmetic applicator in relation to the ridges that form up on the sides of the container diminish the ability for the makeup material to be extracted from the container for application on to the body. As a result, a significant portion of makeup material is left over, generally to be thrown away.

With some cosmetic makeup material containers, color blending is not available and a user is required to blend colors on skin in order to test a new color. It is contemplated that cosmetic makeup material containers can also create difficulty for a user to blend multiple colored loose powders and create desired color due, at least in part, to diminished color pigmentation. Assorted cosmetic makeup material containers may also create a mess during the process of applying the materials to the skin. Hence, there is a consumer goal to be able to recover cosmetic makeup material from waste and/or spoilage via repurposing that provides superior methods and apparatuses to blend, store, and apply cosmetic makeup materials.

It is noted that a cosmetic repurposing device can utilize left-over makeup. As a non-limiting example, a coin can be used to press makeup material into a form that allows for future use. However, this and other such do-it-yourself solutions require a learning curve and experimentation, and also require the use of a variety of other components not specifically intended for the repurposing of makeup. Thus, the resulting repurposed and recaptured left-over makeup remains available generally for placement into either their original containment mechanisms or into ad-hoc, non-standardized containers, which diminish opportunities for compatibility with other existing makeup containers and applicators. As a result, portability and usability of the repurposed makeup is diminished with such coined repurposing assemblies.

It is contemplated that the application of a screen of some standard form can be used to filter may limit, or otherwise impeded, the flow of cosmetic makeup materials of passing through, which makes the use screen untailored to the repurposing of cosmetic material unwieldly and inefficient. Although pressing mechanisms can be associated with forming cosmetic makeup materials, such mechanisms often lack capability to prevent adherence of such cosmetic makeup material to the pressing mechanism following use. As a result, cosmetic material can be wasted. Consequently, the additional time spent by a user either preparing or cleaning the pressing mechanism, or re-engaging the press to capture otherwise wasted cosmetic material, makes use of cosmetic repurposing devices incorporating such presses unwieldy or inefficient.

Furthermore, presses that exhibit problems associated with adherence of cosmetic makeup material leave pressed makeup with undesirable ornamental qualities. One general problem associated with cosmetics is the general lack of standardized sizing of containers, which complicates efforts to collect and repurpose makeup material left over from old makeup containers. For instance, the sizing for a container appropriate for eye shadow differs from the sizing for containment mechanisms for either blush or pressed powder cosmetics and such lack of standardization often creates challenges associated with repurposing left over cosmetic remnants.

Accordingly, a self-contained cosmetic material repurposing system can have a base and a drawer that positions a screen over a void in which a cosmetic container is positioned. The grinding of cosmetic material through the screen fills the container with uniform powder cosmetic material. The isolation of cosmetic material through the screen and in to the container via the void prevents waste and increases efficiency compared to other grating, sifting, or grinding mechanisms. The ability to easily remove a cosmetic container from the void with minimal effort and material waste provides optimal cosmetic repurposing.

Various embodiments are directed to the incorporation of loose cosmetic material into containers. It is noted that makeup container commonly exist in at least five standardized sizes and the assorted embodiments of a cosmetic repurposing system allows a user to select a particularly sized makeup container appropriate to the type of cosmetic material that the user would like to repurpose. It is contemplated that multiple, differently sized, containers can be concurrently filled and repurposed with a self-contained cosmetic repurposing system In some embodiments, the need for standardization of cosmetic containers within a unified kit is addressed by designating separate sized containers to contain any of a variety of types of cosmetic material, such as eye shadow cosmetic material, blush, or bronzer cosmetic materials, and/or pressed powder cosmetic materials. Each makeup container may be standardized to fit within the dimensions of the cosmetic repurposing system to optimize efficiency and modularity.

A makeup container can, without limitation, take the form of makeup tins that consist of tinplate or other materials, such as aluminum, aluminum foil, plastic, other formed metals or alloys. It is contemplated, but not required, that the smallest makeup container in the preferred embodiment of the invention provides containment for eye shadow cosmetic material. The present inventor has recognized that cosmetic material related to eye shadow is most appropriately contained in a containment mechanism smaller than mechanisms containing, for example, blush, bronzer or pressed powder cosmetic materials. In the preferred embodiment of the invention, the smallest makeup container is circular in nature with raised sides along its circumference. For example, the diameter of the smallest container is approximately 1.05 inches with a height of approximately 0.15 inches.

A medium-sized makeup container, which is larger than the makeup container generally intended for eye shadow cosmetic material, can provide useful storage for blush or bronzer cosmetic materials. Such a medium-sized makeup container can be circular in nature with raised sides along the circumference having a diameter of approximately 1.44 inches and the height of approximately 0.135 inches.

In accordance with some embodiments, a cosmetic repurposing system has a third, largest makeup container that is larger than the container generally intended for blush or bronzer cosmetic materials, and provides storage for pressed powder. It is contemplated that the application of pressed powder involves the use of a pad applicator having a diameter of 67 mm or more. The larger diameter of the makeup container generally intended for pressed powder accommodates the efficient application of makeup materials with pads of this size by having a diameter of approximately 1.875 inches and a height approximately 0.175 inches.

After a user determines the appropriately-sized makeup container of the above three sizes, or other available container sizes, based on the type of cosmetic material to be repurposed, the user places the appropriately-sized makeup container into the correspondingly sized void of the base 7. The user may then place the cosmetic material to be repurposed 12 into one of the makeup containers 5 that represents the most-appropriately sized makeup container.

As shown in FIGS. 2-5, a cosmetic manipulation tool 3 can be utilized in accordance with some embodiments. While the cosmetic manipulation tool 3 can be used for a diverse variety of functions, one contemplated use is to remove the cosmetic material to be repurposed from its original container. In another non-limiting embodiment, the tool 3 is used to level the cosmetic material in the container held within the base 7, which can involve running the cosmetic manipulation tool 3 over a pile a loose cosmetic material to even a top profile of the cosmetic material to produce a flat top surface the same height as the vertically-oriented sides of the container.

The cosmetic manipulation tool 3 may take the form of a generally flat scraper. Some embodiments configure the cosmetic manipulation tool 3 with a brush or scraper at the opposite end of a pick tool, or instead only take the form of a pick. An embodiment of a cosmetic repurposing system incorporates a makeup brush within the cosmetic manipulation tool 3 wherein the brush portion protrudes from the distal end opposite a tapered portion. Such a brush allows a user to assist with the transfer of finely ground cosmetic material 12 to be repurposed from the bottom tray 8 or base 7 into one or more makeup containers 5. The cosmetic manipulation tool 3 can also be used to push powder and makeup material solids through the screen.

A screen 9 can be incorporated into a drawer 11, as shown in FIGS. 4, 5, 9, & 10. A makeup pressing tool 2 may or may not be used to push, grate, or grind cosmetic material through the screen into a void in the base 7 where a container is positioned. The makeup pressing tool 2 can be physically independent of the drawer 11 or integrated therein. For example, the makeup pressing tool 2 can be threaded into the sidewall of the drawer 11. In some embodiments, the makeup pressing tool 2 incorporates a pattern of ridges on the underside, which can accelerate and/or optimize the powderization and flow of cosmetic material 12 through the screen 9.

The dimensions of the screen 9 may be configured to exceed the dimensions of a void formed into the drawer 11 such that the screen 9 overlays the entirety of the void. The drawer 11, in some embodiments, incorporates a continuous, or segmented, ledge that facilitates placement and retainment of the screen 9 over the drawer 11 in a controlled manner. For instance, the screen 9 can be configured sot that loose cosmetic material 12 does not transfer into the underlying void without user force.

The drawer 11 and base 7 may fit together as a self-contained unit. It is contemplated that a bottom tray 8 is fit onto the base 7, as shown in FIGS. 1-5. The bottom tray 8 can be configured to receive cosmetic material 12 after it is transferred through the screen 9 fitted within the drawer 11 prior to repurposing. In a non-limiting method of use, a user utilizes the cosmetic manipulation tool 3 to extract cosmetic material 12 from its original container onto the screen 9 and applies force with the makeup pressing tool 2 so that the cosmetic material 12 is forced through the screen 9 and into the tray 8 to be repurposed. When the user utilizes the makeup pressing tool 2 to apply force to the cosmetic material 12 to be repurposed as the material 12 sits on the screen 9, the user may engage in any pressing, grinding, or grating motion with the makeup pressing tool 2 to force the material 12 through the screen 9.

It is noted that the addition of the bottom tray 8 can function to collect the cosmetic material 12 to be repurposed after it has been pressed through the screen 9 and not been collected in a container 5 in a base 7 void, which prevents cosmetic material 12 from being wasted. When the cosmetic material 12 is resident in the bottom tray 8, it will be in powder form and can be directly poured into one or more makeup containers 5.

Figure 6:
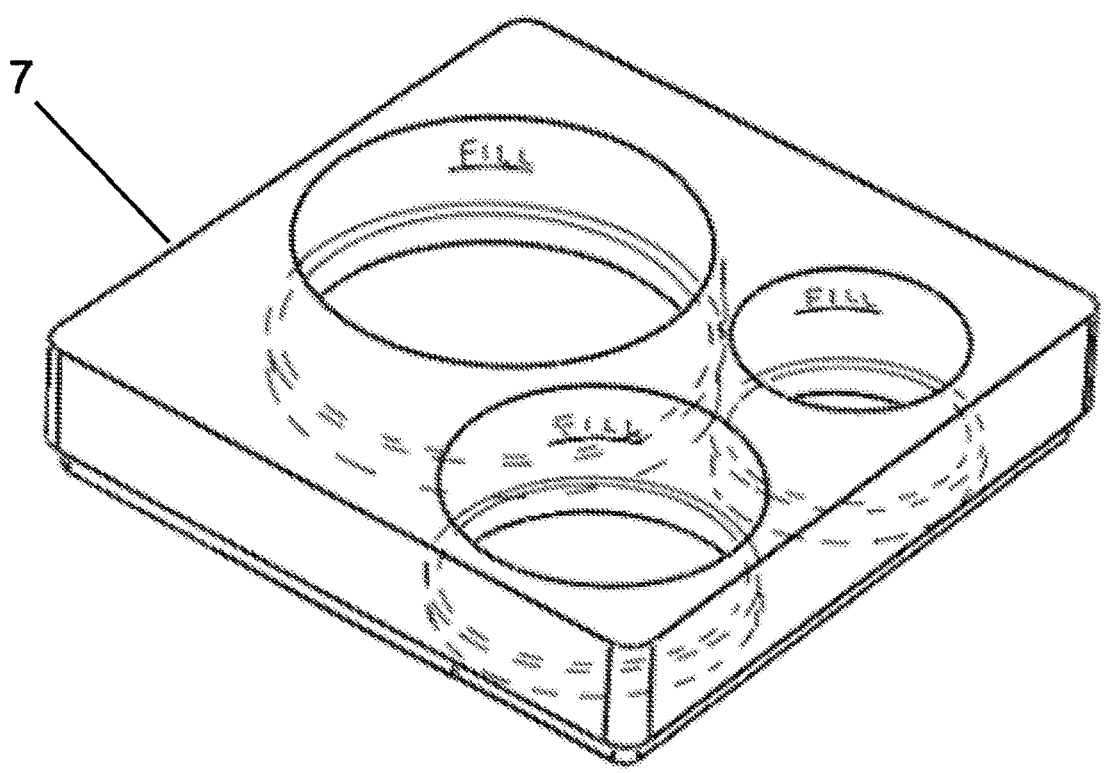
FIG. 6 depicts an example base that can be employed in a self-enclosed cosmetic repurposing system in some embodiments.
Figure 7:
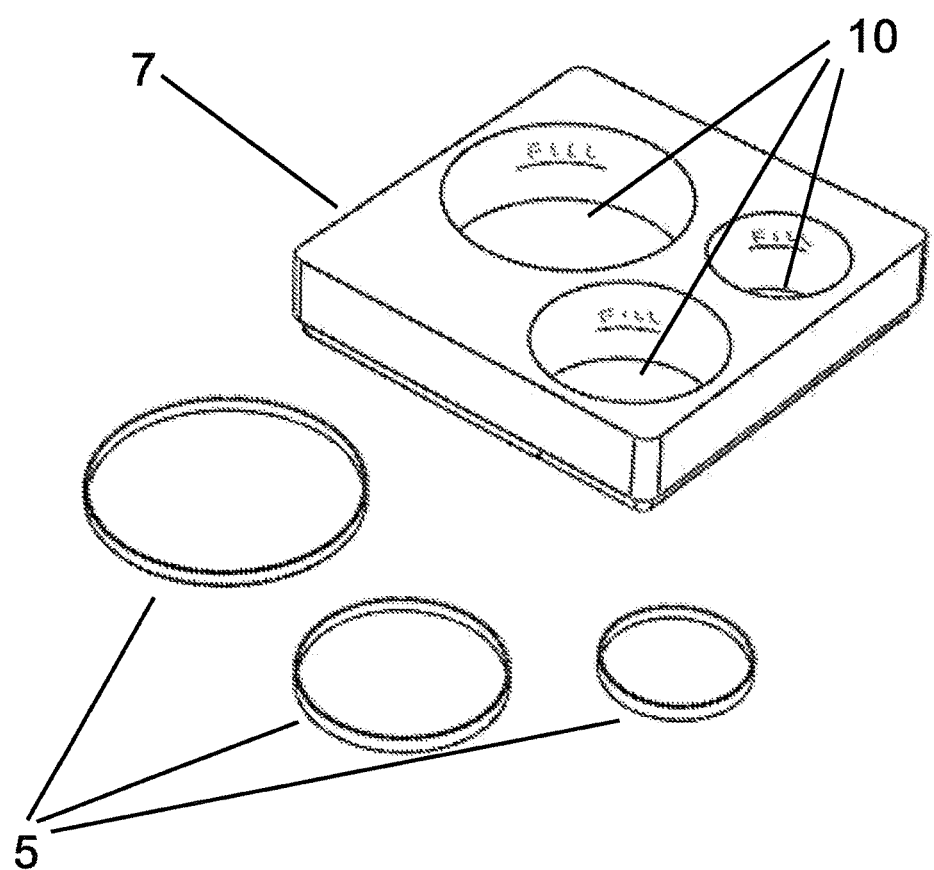
FIG. 7 depicts portions of an example self-enclosed cosmetic repurposing system in which assorted embodiments may be practiced.
Figure 8:
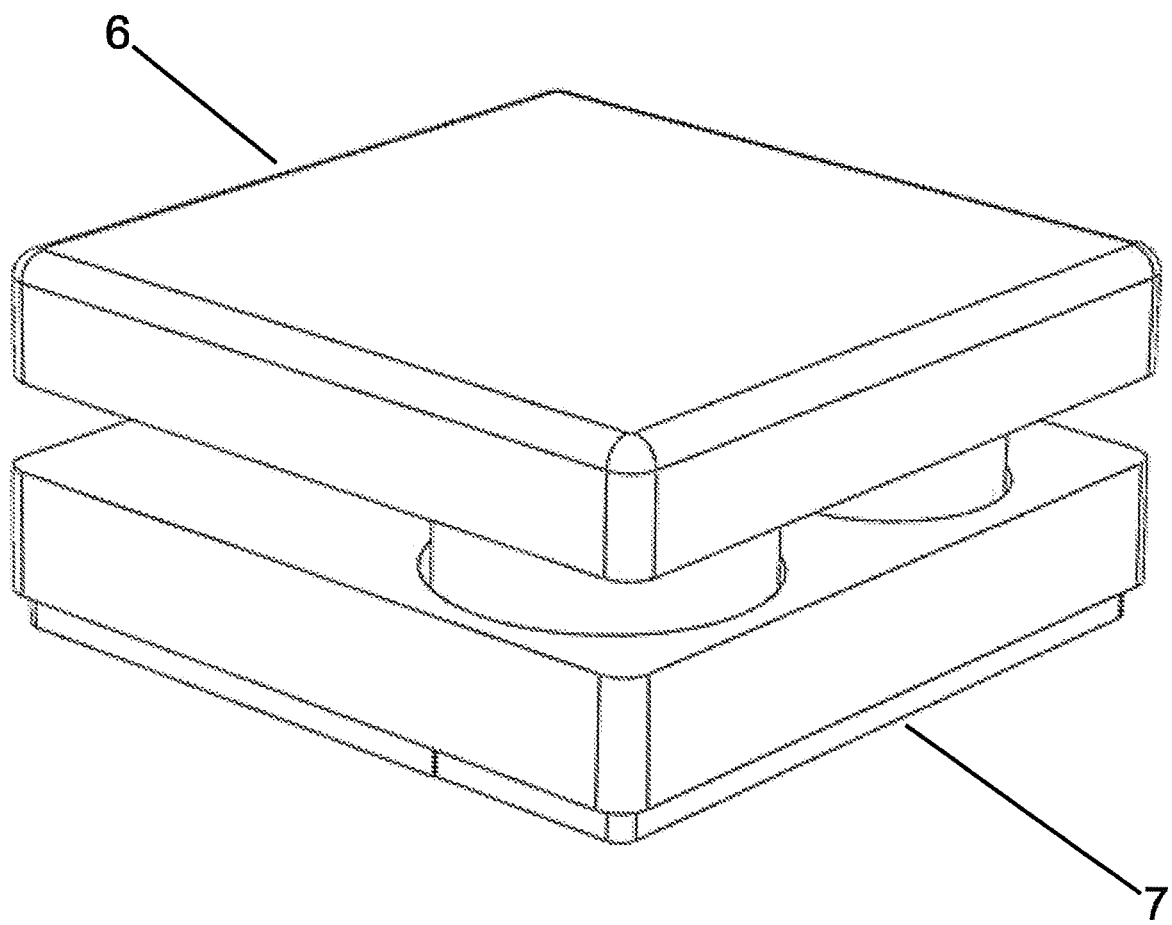
FIG. 8 depicts portions of an example self-enclosed cosmetic repurposing system utilized in accordance with some embodiments.
Figure 9:
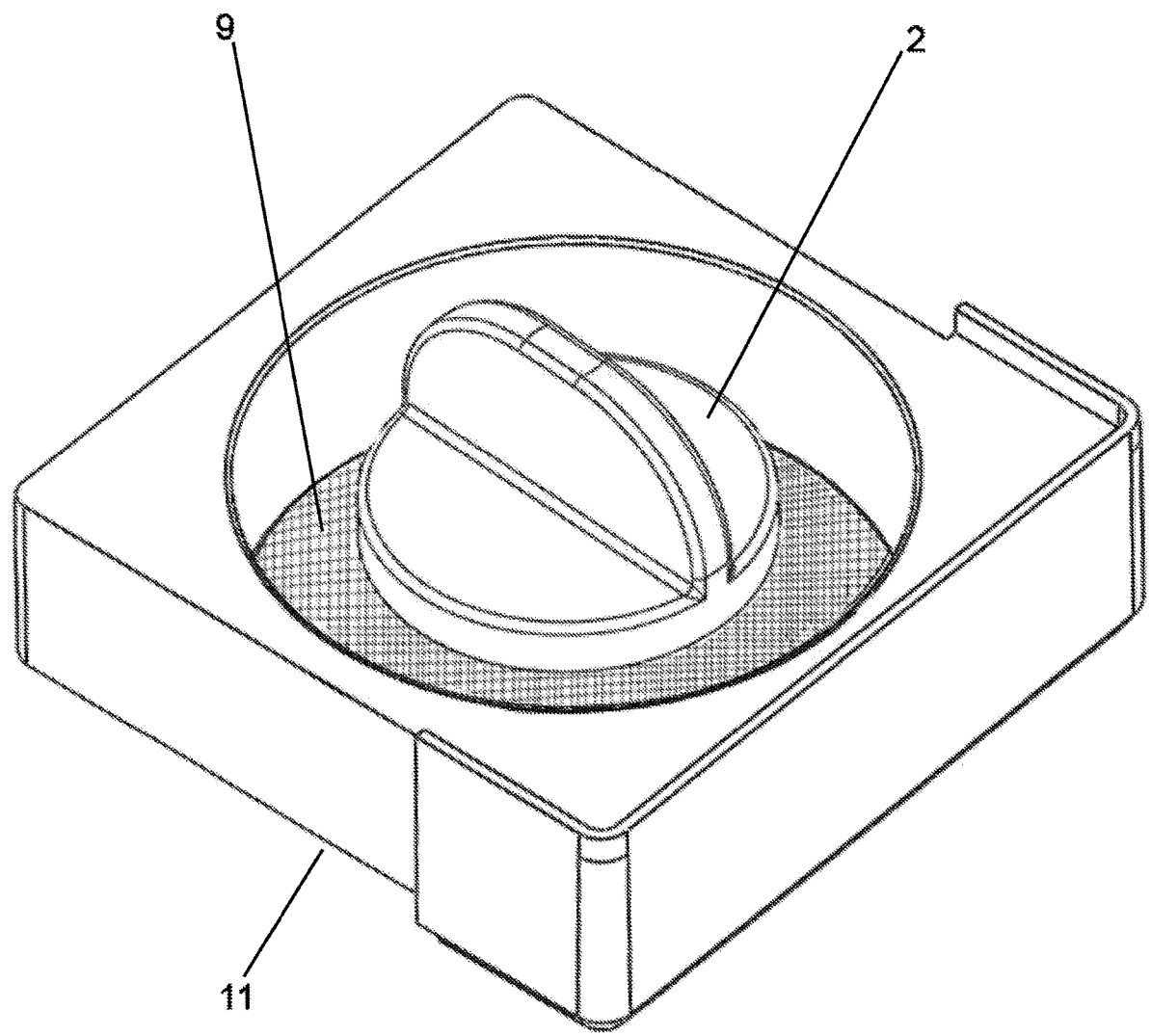
FIG. 9 depicts portions of an example self-enclosed cosmetic repurposing system.
Figure 10:
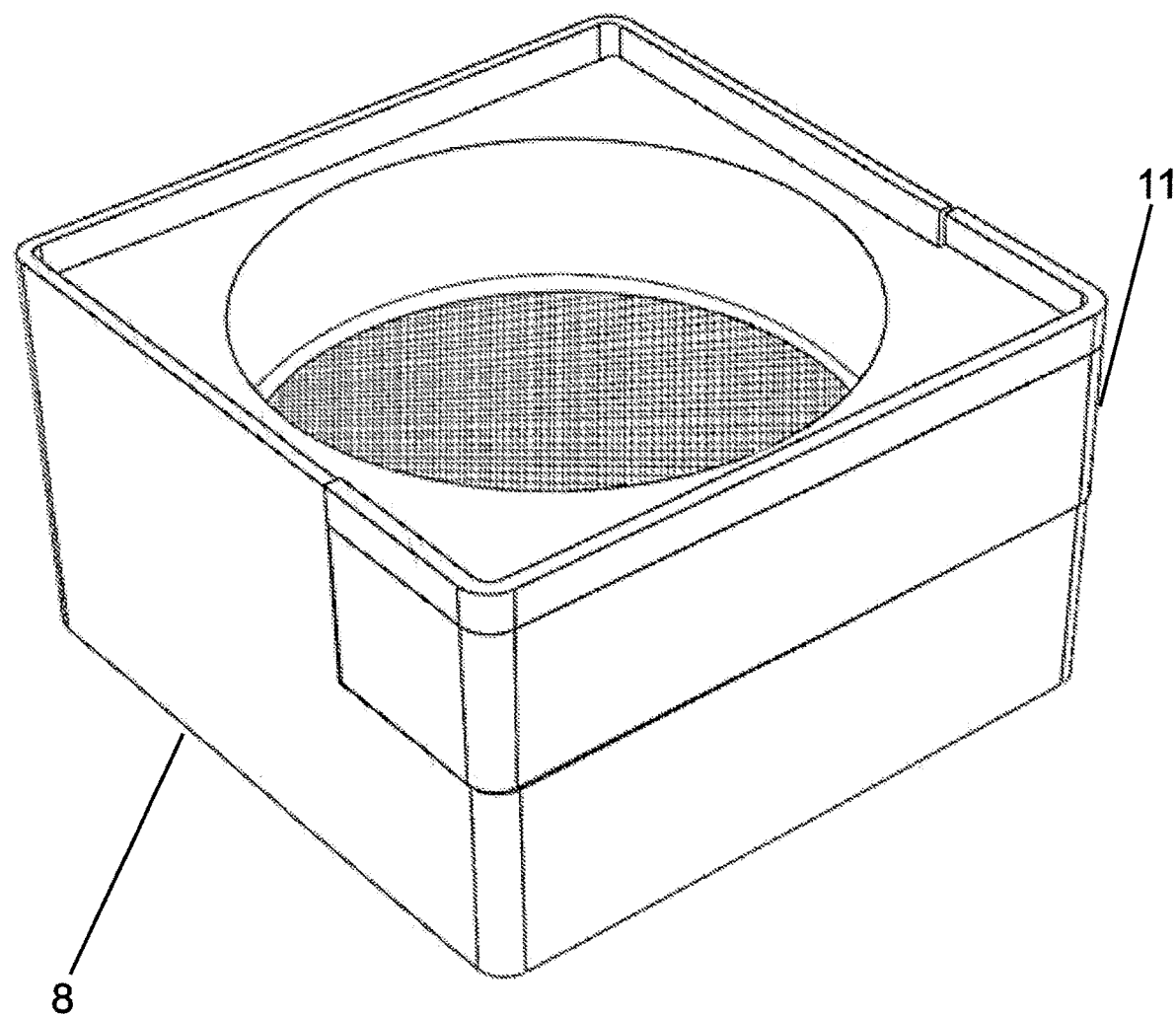
FIG. 10 depicts portions of an example self-enclosed cosmetic repurposing system arranged in accordance with various embodiments.
Figure 11:
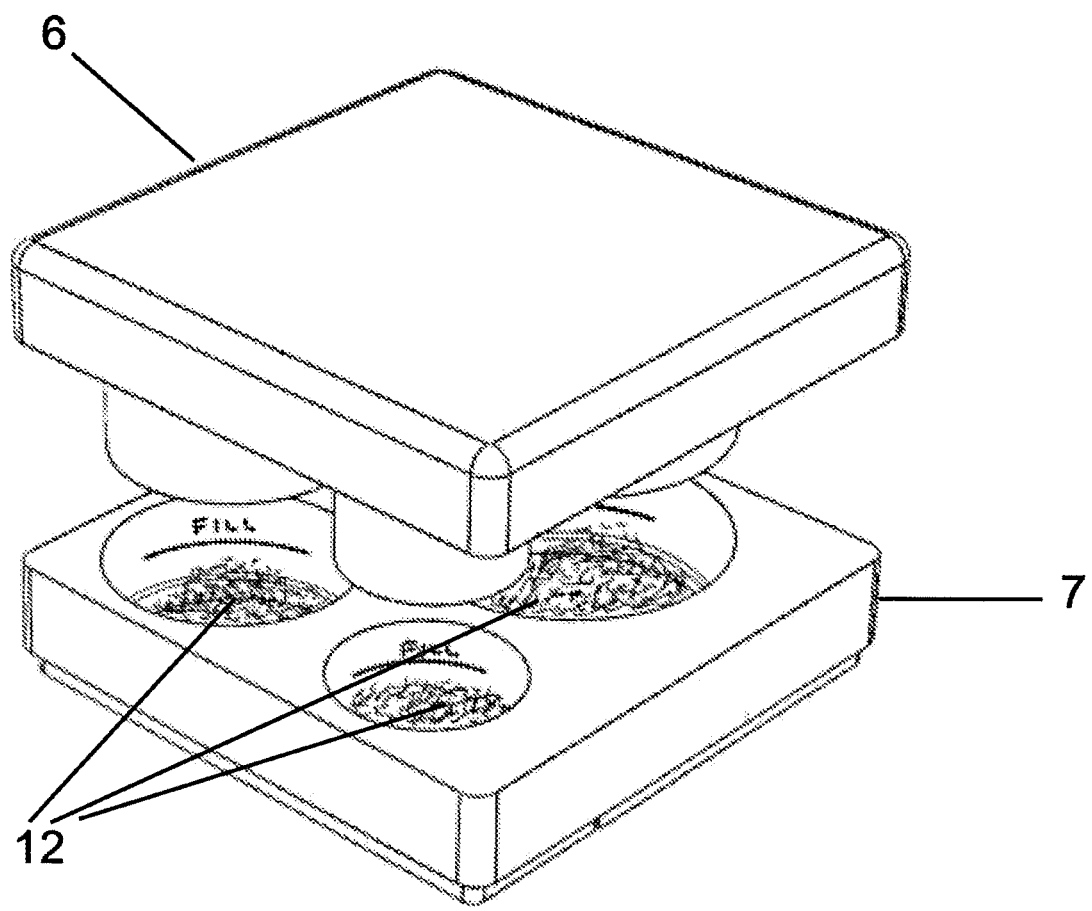
FIG. 11 depicts portions of an example self-enclosed cosmetic repurposing system employed in accordance with assorted embodiments.

In a non-limiting method of use, cosmetic material 12 to be repurposed is poured into one or more makeup containers 5, the one or more makeup containers 5 is/are placed at an opposite end of a void than the screen of the drawer 11. The base 7 can incorporate any number of voids 10, but some embodiments have the three cylindrical voids 10 shown in FIGS. 4-7 that are each specially fitted to securely house three separate makeup containers, which may be similar or dissimilar sized containers. Each void can be configured with a continuous or discontinuous supportive rib to provide structural integrity to the base 7 while supporting the cosmetic container 5 in place. It is contemplated that at least one void 10 has a maximum fill indicator, as depicted in FIG. 6.

It is noted that loose cosmetic material can approximate two or three times the volume of compressed cosmetic material. The positioning of a cosmetic container 5 in the base void 10 allows for the pressing of loose powder into pressed makeup via interaction with a press 6 and/or the pressing tool 2. That is, once loose powder is present in the void 10, a user has the choice to unload the container 5 with loose powder, press the powder into the container 5 with the pressing tool 2, or press the powder into the container 5 with a press 6. Some embodiments involve engaging the pressing tool 2 with the sidewalls of the void 10 via threads, ridges, or grooves, to allow for a more powerful and efficient application of force onto the powder and container 5 than if the tool 2 was not connected to the void sidewalls.

In the event a press 6 is employed alone, or in combination with the pressing tool 2, the press 6 can function as a handheld object that enables a user to apply pressure to cosmetic material 12 in multiple voids 10 to be repurposed. In varying embodiments, the press 6 also functions as a structural element of the one unified form 1 of the system, more precisely as a lid for the self-enclosed cosmetic repurposing system that has a non-limiting shape, such as square, rectangle, pyramid, cylindrical, or rhomboid. The press 6 can, in some embodiments, integrate one or more cups and/or protrusions sized to fit into the voids 10 of the base 7. For instance, the press protrusions can be cylindrically-shaped extending from the press' main body to minimize the adherence of cosmetic material 12 to the press 6 during use. The press protrusions can be constructed of a material that prevent adherence of cosmetic material 12 during pressing, such as silicone, rubber, or a combination thereof.

In embodiments of the press 6 designed to incorporate protrusions, cross section supports are positioned within the cups shaped to bolster the structural integrity of the unit during the intended pressing action, such as with cylindrical, square, oval, round, and pyramidal shapes. It is contemplated that the shaped protrusions incorporate round, flat disks to ensure that the cosmetic material 12 compressed with the press has a flat and smooth profile in the container 5. Such a flat profile is preferred to non-uniform material profiles that make use difficult and inefficient.

In a non-limiting method of use for a cosmetic repurposing system, the user determines which size of the makeup containers 5 best corresponds to the amount and type of cosmetic material 12 to be repurposed. Once determined, the user then places the appropriately sized makeup container into the correspondingly sized cylindrical void 10 within the base 7. The user then places cosmetic material 12 to be repurposed that has been forced through the screen 9 into the void of the base 7 where said appropriately sized makeup container resides.

An embodiment of a cosmetic repurposing system may incorporate a solution 4 that can be applied to the cosmetic material 12 to be repurposed to enhance pressing operation and/or performance of the pressed makeup material. It is noted that some forms of cosmetic material to be repurposed, such as mineral makeup or makeup that is already in the form of a loose powder, may not require the use of solution. In a non-limiting function, when the user determines that solution is appropriate to be applied, the user will apply solution dispensed from the container for solution 4 to cosmetic material 12 to be repurposed after it is placed within one or more makeup containers 5 after placement of said makeup containers within the base 7.

Generally, a solution 4 may serve as a chemical base to formulate cosmetics. Alcohol Denat., the general name used for denatured alcohol, or isopropyl alcohol may be employed and function as the solution 4, but such is not required. In the United States, Alcohol and Alcohol Denat. are regulated by the Alcohol and Tobacco Tax and Trade Bureau (TTB) of the Department of Treasury. They specify how alcohol is denatured and the types of products in which the specific denatured alcohols are permitted for use. Specific denatured alcohols as defined by the TTB that are permitted for use in cosmetics and personal care products include Specially Denatured (SD) Alcohol 3-A, SD Alcohol 30, SD Alcohol 39, SD Alcohol 39-B, SD Alcohol 39-C, SD Alcohol 40, SD Alcohol 40-B and SD Alcohol 40-C. Denatonium Benzoate, Quassin, Brucine and Brucine Sulfate are examples of denaturants. As such, an SD Alcohol 40, or other alcohol may serve as the solution 4. However, a variety of variants, including and in addition to those listed above, may also function as the solution 4.

Regardless of whether solution 4 has been applied, packaging of repurposed cosmetic material can involve the user forcing the press 6 onto the cosmetic material 12 positioned in a container 5 oriented in a void 10 of the base 7. Varying embodiments may optionally incorporate the step of placing a standard facial tissue over the base 7 prior to the user's application of pressure with the press 6 to prevent adhesion of cosmetic material 12 to the press 6 after being sprayed with solution 4. It is contemplated that placement of tissue may reduce the need for cleaning the press 6. Alternative embodiments can utilize silicone, Teflon, or other non-stick material, on the contact edge of the press 6 to prevent adhesion of cosmetic material 12 to the press 6 resulting from the pressing process.

An example embodiment may further incorporate a workspace mat that approximates the dimensions of a standard sized rectangular placemat and is constructed of durable and easy to clean materials, such as vinyl, rubber, plastic, or combinations thereof.

Figure 12:
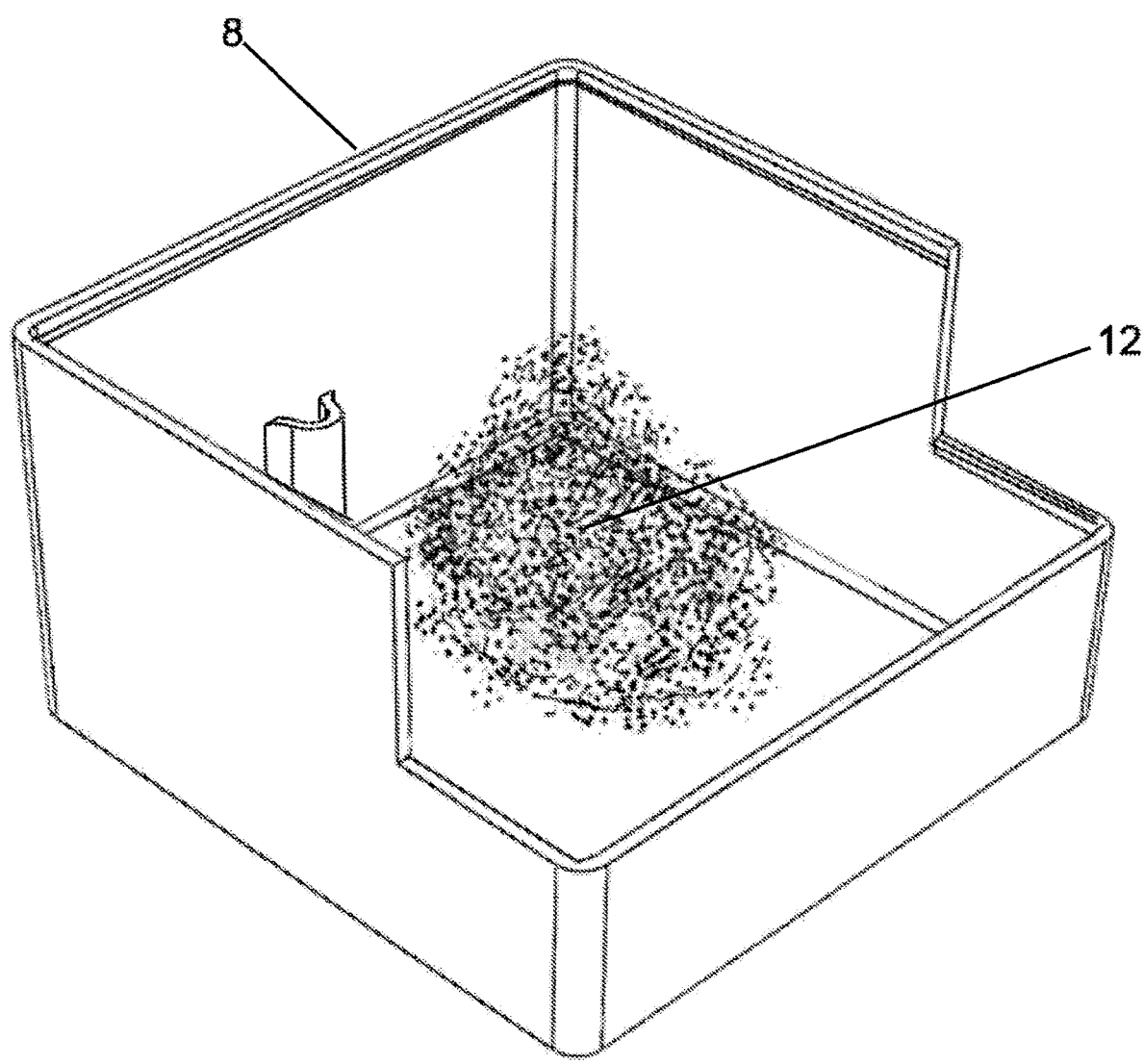
FIG. 12 depicts an example bin portion of an example self-enclosed cosmetic repurposing system.
Figure 13:
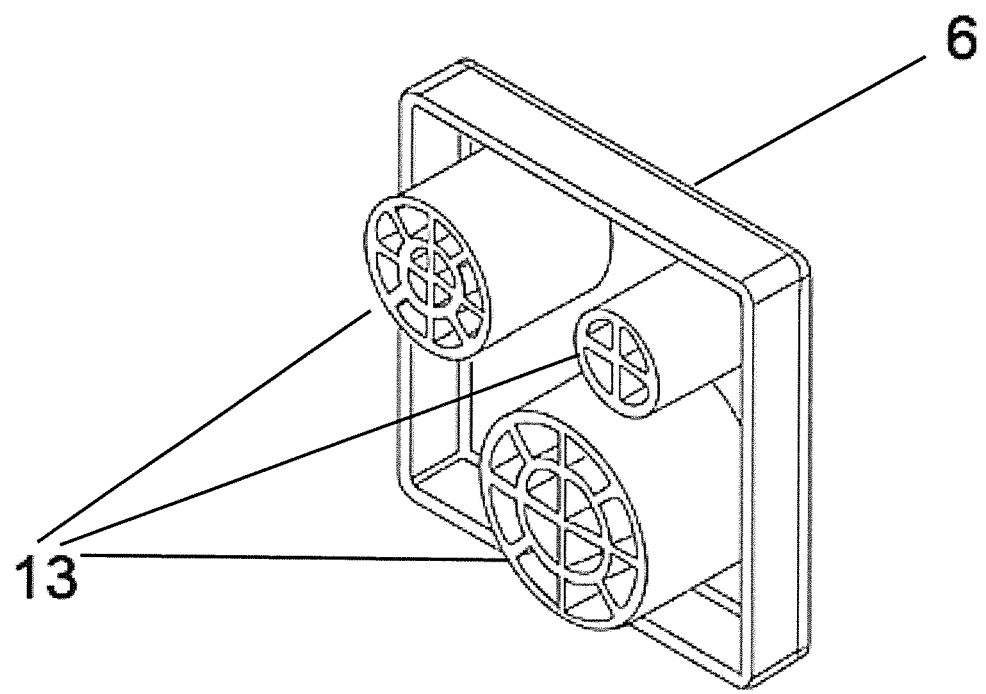
FIG. 13 depicts an example press portion of an example self-enclosed cosmetic repurposing system.

In an exemplary method of using a cosmetic repurposing system to mix various types of cosmetic materials into makeup containers 5, a user initially chooses the mixture of one or more cosmetic materials 12 the user would like to repurpose. A user may choose the mixture with the intent of general repurposing of cosmetic materials or with the intent to choose the mixture to specifically create a new color, hue and/or shade of cosmetic. The user may scoop the chosen mixture of cosmetic materials into the bottom tray 8 as depicted in FIG. 12. In some embodiments, the blends the chosen mixture of cosmetic materials within the bottom tray 8 through use of either the cosmetic manipulation tool 3, or by use of a mixing apparatus not contained within the system such as a common table spoon.

With the chosen mixture of cosmetic materials, the user then places the materials atop the screen of a drawer that is positioned above a base that houses at least one container 5 that has a selected size. The user may proceed to insert one or more makeup containers 5 into the base 7 and then places the cosmetic material 12.

The cosmetic material is forced through the screen with one or more user movements so that the cosmetic material is powderized and forced into the underlying container 5. Such force may be characterized as grinding motion and can be facilitated with the pressing tool 2, but not by hand. Once the cosmetic material powder is present in the container 5, the drawer 11 and screen can be removed, or remain, while the powder is pressed into the container 5. It is contemplated that the powder is pressed with the pressing tool 2 via a twisting motion guided by engagement of the tool 2 with the sidewalls of the base void 10. In other embodiments, a user can employ a solution 4 to the powder prior to, during, and/or after a pressing motion, such as if the powderized cosmetic material mixture is non-mineral in nature.

In addition to, or alternatively to the use of the pressing tool 2, a user can utilize the press 6 to force powder into one or more containers concurrently. The resulting pressed cosmetic material can subsequently be used for general makeup application once the container(s) are removed from the base 7. It is contemplated that one or more solutions and/or materials can be added atop of pressed, or powder, cosmetic material present in a container 5.

In the foregoing specification, specific embodiments have been described. However, one of ordinary skill in the art appreciates that various modifications and changes can be made without departing from the scope of the technology as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The terms "coupled" and "linked" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A method comprising:
   positioning a screen above a void of a base, the screen attached to a drawer and positioned proximal an aperture extending through the drawer;
   inserting a cosmetic material atop the screen;
   forcing the cosmetic material through the screen into the void; and
   filling a container positioned in the void with powderized cosmetic material.

2. The method of claim 1, wherein the cosmetic material is forced through the screen with a tool.

3. The method of claim 2, wherein the tool has a surface contacting the cosmetic material comprising at least one ridge to aid in passing the cosmetic material through the screen.

4. The method of claim 2, wherein the tool is separate from a drawer, the screen attached to a drawer.

5. The method of claim 1, wherein the cosmetic material is forced through the screen with a grinding motion.

6. The method of claim 1, wherein the container is temporarily held in the void via at least one ridges extending from a sidewall of the void.

7. The method of claim 1, wherein the drawer nests within the base to form a cabinet.

8. The method of claim 1, wherein the base comprises multiple separate voids.

9. The method of claim 8, wherein the multiple separate voids respectively have different diameters.

10. A method comprising:
positioning a screen above a void of a base, the screen attached to a drawer and positioned proximal an aperture extending through the drawer;
inserting a cosmetic material atop the screen;
forcing the cosmetic material through the screen into the void;
filling a container positioned in the void with powderized cosmetic material; and
pressing the powderized cosmetic material into a form within the container.

11. The method of claim 10, wherein a pressing tool is used to apply force to the powderized cosmetic material during pressing.

12. The method of claim 11, wherein the pressing tool is physically separate from the base.

13. The method of claim 11, wherein the pressing tool engages a sidewall of the void during pressing.

14. The method of claim 13, wherein the pressing tool engages a threaded guide of the void sidewall during pressing.

15. The method of claim 11, wherein the pressing tool comprises a rigid protrusion sized to fit within the void and contact the powderized cosmetic material.

16. The method of claim 11, wherein the pressing tool comprises a plurality of protrusions configured to concurrently engage separate voids of the base.

17. The method of claim 16, wherein the plurality of protrusions are different diameters.

18. The method of claim 16, wherein the plurality of protrusions are different depths within the respective separate voids.

19. The method of claim 10, wherein the container is removed from the base with the pressed cosmetic material resident in the container.

* * * * *